(12) United States Patent
Kurtz et al.

(10) Patent No.: US 12,190,255 B2
(45) Date of Patent: Jan. 7, 2025

(54) ARTIFICIAL INTELLIGENCE ASSISTED SPORTS STRATEGY PREDICTOR

(71) Applicant: KYNDRYL, INC., New York, NY (US)

(72) Inventors: Steven Joseph Kurtz, Austin, TX (US); Pritpal S. Arora, Bangalore (IN); Tedrick N. Northway, High Springs, FL (US); Laxmikantha Sai Nanduru, Secunderabad (IN); Clea Anne Zolotow, Key West, FL (US)

(73) Assignee: Kyndryl, Inc., New York, NY (US)

( * ) Notice: Subject to any disclaimer, the term of this patent is extended or adjusted under 35 U.S.C. 154(b) by 1016 days.

(21) Appl. No.: 16/432,170

(22) Filed: Jun. 5, 2019

(65) Prior Publication Data
US 2020/0387817 A1 Dec. 10, 2020

(51) Int. Cl.
*G06F 17/00* (2019.01)
*A63B 24/00* (2006.01)
*G06F 18/25* (2023.01)
*G06N 5/045* (2023.01)
*G06N 5/046* (2023.01)
*G06N 20/00* (2019.01)
*G06T 7/20* (2017.01)
(Continued)

(52) U.S. Cl.
CPC ......... *G06N 5/045* (2013.01); *A63B 24/0062* (2013.01); *G06F 18/251* (2023.01); *G06N 5/046* (2013.01); *G06N 20/00* (2019.01); *G06T 7/20* (2013.01); *G06V 10/768* (2022.01); *G06V 20/40* (2022.01); *G06V 20/42* (2022.01); *G06T 2207/30196* (2013.01)

(58) Field of Classification Search
CPC ........ G06N 5/045; G06N 20/00; G06N 5/046; G06V 20/42; A63B 24/0062; G06K 9/6289
See application file for complete search history.

(56) References Cited

U.S. PATENT DOCUMENTS

| 6,394,895 | B1 * | 5/2002 | Mino | ...... A63F 13/65 463/43 |
| D626,440 | S * | 11/2010 | Daicos | ...... D10/97 |
| 7,880,762 | B1 | 2/2011 | Fernandez | |

(Continued)

FOREIGN PATENT DOCUMENTS

| WO | 2000051259 A1 | 8/2000 | |
| WO | WO-2008067499 A2 * | 6/2008 | ...... A63F 13/10 |
| WO | 2016154663 A1 | 10/2017 | |

OTHER PUBLICATIONS

Authors et. al, Method and Apparatus for Predicting Pitch and Outcome with Environmental Cues, IP.com No. IPCOM000252166D, IP.com Electronic Publication Date: Dec. 19, 2017, 5 Pages (Year: 2017).*

(Continued)

*Primary Examiner* — Mohammed H Zuberi
(74) *Attorney, Agent, or Firm* — CANTOR COLBURN LLP; Erik Swanson

(57) ABSTRACT

Computer systems that use artificial intelligence to predict strategies, scenarios and or game plans for sports games that are already in progress. In some embodiments a feedback loop is used so that the artificial intelligence takes into account events occurring in and/or around the game as they occur to provide updated predictions.

20 Claims, 8 Drawing Sheets

(51) Int. Cl.
*G06V 10/70* (2022.01)
*G06V 20/40* (2022.01)

(56) References Cited

U.S. PATENT DOCUMENTS

| | | | | |
|---|---|---|---|---|
| 8,210,916 | B2* | 7/2012 | Ma | A63F 13/798 |
| | | | | 463/7 |
| 8,812,734 | B2 | 8/2014 | Shafi | |
| 8,817,078 | B2 | 8/2014 | Gay | |
| 8,882,613 | B2* | 11/2014 | Zuger | G04G 21/00 |
| | | | | 463/3 |
| 8,887,185 | B2 | 11/2014 | Kim | |
| 9,020,415 | B2 | 4/2015 | Buehler | |
| 9,049,259 | B2 | 6/2015 | Rathod | |
| 9,055,271 | B2 | 6/2015 | Verna | |
| 10,016,668 | B2* | 7/2018 | Lee | G06F 17/18 |
| 10,096,033 | B2 | 10/2018 | Heath | |
| 10,213,698 | B2* | 2/2019 | Moh | A63F 13/30 |
| 10,583,345 | B2* | 3/2020 | Huke | G06Q 10/0639 |
| 10,713,494 | B2* | 7/2020 | Chang | H04N 5/268 |
| 11,244,385 | B1* | 2/2022 | Fraser | G06F 3/0482 |
| 2002/0080279 | A1 | 6/2002 | Wang | |
| 2002/0132211 | A1* | 9/2002 | August | G09B 19/0038 |
| | | | | 434/362 |
| 2003/0204275 | A1* | 10/2003 | Krubeck | A63B 71/06 |
| | | | | 700/91 |
| 2005/0252498 | A1* | 11/2005 | Donald | A63B 69/406 |
| | | | | 124/6 |
| 2007/0000007 | A1* | 1/2007 | MacDonald | A41D 13/0015 |
| | | | | 2/69 |
| 2007/0005540 | A1* | 1/2007 | Fadde | A63B 71/0622 |
| | | | | 706/21 |
| 2007/0072679 | A1* | 3/2007 | Kerns | A63F 13/65 |
| | | | | 463/42 |
| 2007/0085908 | A1 | 4/2007 | Honey | |
| 2008/0268929 | A1* | 10/2008 | Billmaier | G07F 17/3276 |
| | | | | 463/4 |
| 2009/0262137 | A1* | 10/2009 | Walker | H04H 60/04 |
| | | | | 345/629 |
| 2010/0048331 | A1* | 2/2010 | Guilfoyle | A63B 69/0002 |
| | | | | 473/600 |
| 2010/0283630 | A1 | 11/2010 | Alonso | |
| 2011/0053688 | A1* | 3/2011 | Crawford | A63D 5/04 |
| | | | | 463/31 |
| 2012/0033825 | A1 | 2/2012 | Zinn, II | |
| 2013/0267328 | A1* | 10/2013 | Heisler | G07F 17/3244 |
| | | | | 463/42 |
| 2014/0236331 | A1* | 8/2014 | Lehmann | G09B 19/0038 |
| | | | | 700/91 |
| 2014/0364978 | A1* | 12/2014 | Wohl | G06F 16/9554 |
| | | | | 700/91 |
| 2015/0228309 | A1* | 8/2015 | Bartlow | A63F 13/00 |
| | | | | 386/278 |
| 2015/0260512 | A1* | 9/2015 | Greiner | G01S 13/88 |
| | | | | 702/150 |
| 2015/0356408 | A1 | 12/2015 | Faith | |
| 2015/0356412 | A1 | 12/2015 | Faith | |
| 2016/0320941 | A1* | 11/2016 | McQuistan | G06F 3/04812 |
| 2017/0061314 | A1* | 3/2017 | Schnurr | H04N 21/25891 |
| 2017/0223415 | A1* | 8/2017 | Jeon | H04N 21/6125 |
| 2018/0339213 | A1* | 11/2018 | Baughman | G06N 5/04 |
| 2018/0339214 | A1* | 11/2018 | Baughman | G06N 5/04 |
| 2019/0155969 | A1* | 5/2019 | Haaland | G06N 7/01 |
| 2019/0366189 | A1* | 12/2019 | Plant | G06F 18/22 |
| 2020/0061478 | A1* | 2/2020 | Kopf | G07F 17/326 |
| 2020/0324206 | A1* | 10/2020 | Yilmazcoban | A63F 13/67 |
| 2021/0322825 | A1* | 10/2021 | Marley | G06N 3/045 |
| 2024/0307738 | A1* | 9/2024 | Tamir | G06V 20/52 |

OTHER PUBLICATIONS

Xinyu Wei et al, Predicting Shot Locations in Tennis using Spatiotemporal Data, 2013 International Conference on Digital Image Computing: Techniques and Applications (DICTA) (pp. 1-8) (Year: 2013).*

"Method and System for Inducing Fairness in Online Gaming by Adjusting Player's Device(s) and Gameplay", An IP.com Prior Art Database Technical Disclosure, Authors et. al.: Disclosed Anonymously, IP.com No. IPCOM000253342D, IP.com Electronic Publication Date: Mar. 23, 2018, 3 pages.

Cadiz, Chris, "Artificial Intelligence in Professional Sports", Jun. 7, 2017, 5 pages, Arclabs, Inc., <https://arclabsonline.com/blog/artificial-intelligence-in-professional-sports>.

IBM, "Smarter content delivery", IBM Sales and Distribution, White Paper Executive Summary, Produced in the USA Sep. 2014, 6 pages.

IBM, "Digitize and automate your Telecommunication, Media and Entertainment business", IBM United Kingdom, downloaded from the internet Jan. 10, 2019, 5 pages, <https://www.ibm.com/uk-en/industries/telecom-media-entertainment>.

Marotti, Ally, "Sports tech firm Stats looks to bring A.I. to the broadcast booth and sideline", <https://phys.org/news/2018-04-sports-tech-firm-stats-ai.html>, Apr. 20, 2018, Chicago Tribune, 4 pages.

* cited by examiner

WELCOME TO BASEBALL STADIUM, 30,108 FANS IN ATTENDANCE.  112
GAME STARTS IN 10 MINUTES

TEAM A'S EXPECTED STRATEGY IS:
    PLAY AGGRESSIVE BY TAKING MANY DISCRETIONAL RISKS
    AT THE MARGIN

TEAM A'S EXPECTED BASE STEALING GAME PLAN IS:
    DON'T STEAL BASES BECAUSE TEAM B's STARTING CATCHER IS
    EXCELLENT AT THROWING OUT RUNNERS ATTEMPTING TO STEAL

TEAM A'S CURRENT SCENARIO IS:
    EXPECT TO WIN AND GO ON TO FACE THE EXPECTED WINNER OF
    TODAY'S CONCURRENT GAME, NAMELY, TEAM C

SCORE:   TEAM A: 0; TEAM B: 0

FIG. 4A

IT IS SEVENTH INNING STRETCH TIME HERE AT BASEBALL STADIUM   112

TEAM A'S EXPECTED STRATEGY IS:
    PLAY DEFENSIVELY BY NOT TAKING RISKS IN ORDER TO
    PRESERVE THAT SLIM LEAD OVER TEAM B

TEAM A'S EXPECTED BASE STEALING GAME PLAN IS:
    TRY TO STEAL BASES BECAUSE TEAM B HAS CHANGED CATCHERS

TEAM A'S CURRENT SCENARIO IS:
    EXPECTED TO WIN AND GO ON TO FACE TEAM D IN NEXT ROUND,
    BECAUSE TEAM D HAS WON TODAY'S CONCURRENT GAME
    AGAINST TEAM C

SCORE:   TEAM A: 5; TEAM B: 4

FIG. 4B

ARTIFICIAL INTELLIGENCE ASSISTED SPORTS STRATEGY PREDICTOR

BACKGROUND

The present invention relates generally to the field of computers, and more particularly to computers that make predictions related to sports contests.

Many sporting contests (herein sometimes referred to as "games") are covered by real-time audio and/or video broadcasts. It is known that people watch these real-time sports broadcasts are often interested in strategies, scenarios and game plans related to the sporting contest which they are watching.

For purposes of this document, a strategy is defined as a pattern of choices made by player(s) and/or coach(es) in playing the sports game. Typically, a strategy looks ahead in a recursive manner and considers what actions can happen in each contingent state of the game. For example, if the player takes action 1, then that presents the opponent with a certain situation, which might be good or bad, whereas if the player takes action 2 then the opponents will be presented with a different situation, and in each case the choices they make will determine their own future situation. Sports strategy typically involves players and/or coaches thinking through a sequence of plays or portions of play to determine the best way to attempt to defeat the opponent(s). Strategies may be expressed as a library of general execution possibilities for a sport. As an example of a strategy, if a key player in a team is injured and missing, the team in question may adopt defensive strategy than go aggressively and expose themselves to the possibility of losing the match.

In contrast with strategies, game-plans are specific, tactical responses to the circumstances/conditions/backdrop under which the current game is being played. Both have a huge bearing on the outcomes of the game. Conversely, the team could alter its player combinations, pace, etc. based on the pitch conditions, composition of the opponent team, impact of the result of the current game on the overall progress of the team within a tournament, etc. One example of a game plan related to basketball is to favor shooting long shots for three points over shorter shots for two points. An example of a game plan related to tennis is to be relatively aggressive on first serves thereby increasing the probability of an ace, but also increasing the probability that a second server will be needed. An example of a game plan related to baseball would be to change pitchers any time the opposing team gets a runner as far as second base.

For purposes of this document, a scenario is defined as a point in time challenge confronting a team. For example, in a multi-team tournament, team A is placed in a scenario where it must defeat or draw its opponent in the current game (team X) to qualify and advance further from the group. Another scenario could be that, a team must earn at least a draw in the current game in remain in the pool and stave off elimination. On the other side of spectrum, a completely different scenario could be that a team inexperienced in playing in a high-altitude venue, is facing a home team well versed with such conditions.

The Wikipedia entry for "artificial intelligence" (as of May 9, 2019) defines artificial intelligence as follows: "In computer science, artificial intelligence (AI), sometimes called machine intelligence, is intelligence demonstrated by machines, in contrast to the natural intelligence displayed by humans and animals. Computer science defines AI research as the study of 'intelligent agents': any device that perceives its environment and takes actions that maximize its chance of successfully achieving its goals. Colloquially, the term 'artificial intelligence' is used to describe machines that mimic 'cognitive' functions that humans associate with other human minds, such as 'learning' and 'problem solving' .... Modern machine capabilities generally classified as AI include successfully understanding human speech, competing at the highest level in strategic game systems (such as chess and Go), autonomously operating cars, intelligent routing in content delivery networks, and military simulations. Artificial intelligence can be classified into three different types of systems: analytical, human-inspired, and humanized artificial intelligence. Analytical AI has only characteristics consistent with cognitive intelligence; generating a cognitive representation of the world and using learning based on past experience to inform future decisions. Human-inspired AI has elements from cognitive and emotional intelligence; understanding human emotions, in addition to cognitive elements, and considering them in their decision making. Humanized AI shows characteristics of all types of competencies (i.e., cognitive, emotional, and social intelligence), is able to be self-conscious and is self-aware in interactions . . . " (Footnotes omitted).

SUMMARY

According to an aspect of the present invention, there is a method, computer program product and/or system that performs the following operations (not necessarily in the following order): (i) during a sports game in progress, receiving a first data set including data relevant to strategy likely to be used by at least one of the opponents in the sports game, with the first data set including data relating to a first event that has occurred during the sports game in progress; (ii) applying artificial intelligence to the first data set to predict a first predicted strategy likely to be used by the at least one opponent during the sports game; and (iii) presenting the first predicted strategy in human understandable form and format.

According to an aspect of the present invention, there is a method, computer program product and/or system that performs the following operations (not necessarily in the following order): (i) during a sports game in progress, receiving a first data set including data relevant to a scenario applicable to at least one of the opponents in the sports game, with the first data set including data relating to a first event that has occurred during the sports game in progress; (ii) applying artificial intelligence to the first data set to predict a first predicted scenario likely to be applicable to the at least one opponent during or after the sports game; and (iii) presenting the first predicted scenario in human understandable form and format.

According to an aspect of the present invention, there is a method, computer program product and/or system that performs the following operations (not necessarily in the following order): (i) during a sports game in progress, receiving a first data set including data relevant to a game plan likely to be used by at least one of the opponents in the sports game, with the first data set including data relating to a first event that has occurred during the sports game in progress; (ii) applying artificial intelligence to the first data set to predict a first predicted game plan likely to be used by the at least one opponent during the sports game; and (iii) presenting the first predicted game plan in human understandable form and format.

BRIEF DESCRIPTION OF THE DRAWINGS

FIG. 4A is a screenshot view of a stadium billboard generated by the first embodiment system;

FIG. 4B is a screenshot view of a stadium billboard generated by the first embodiment system;

DETAILED DESCRIPTION

Figure 1:
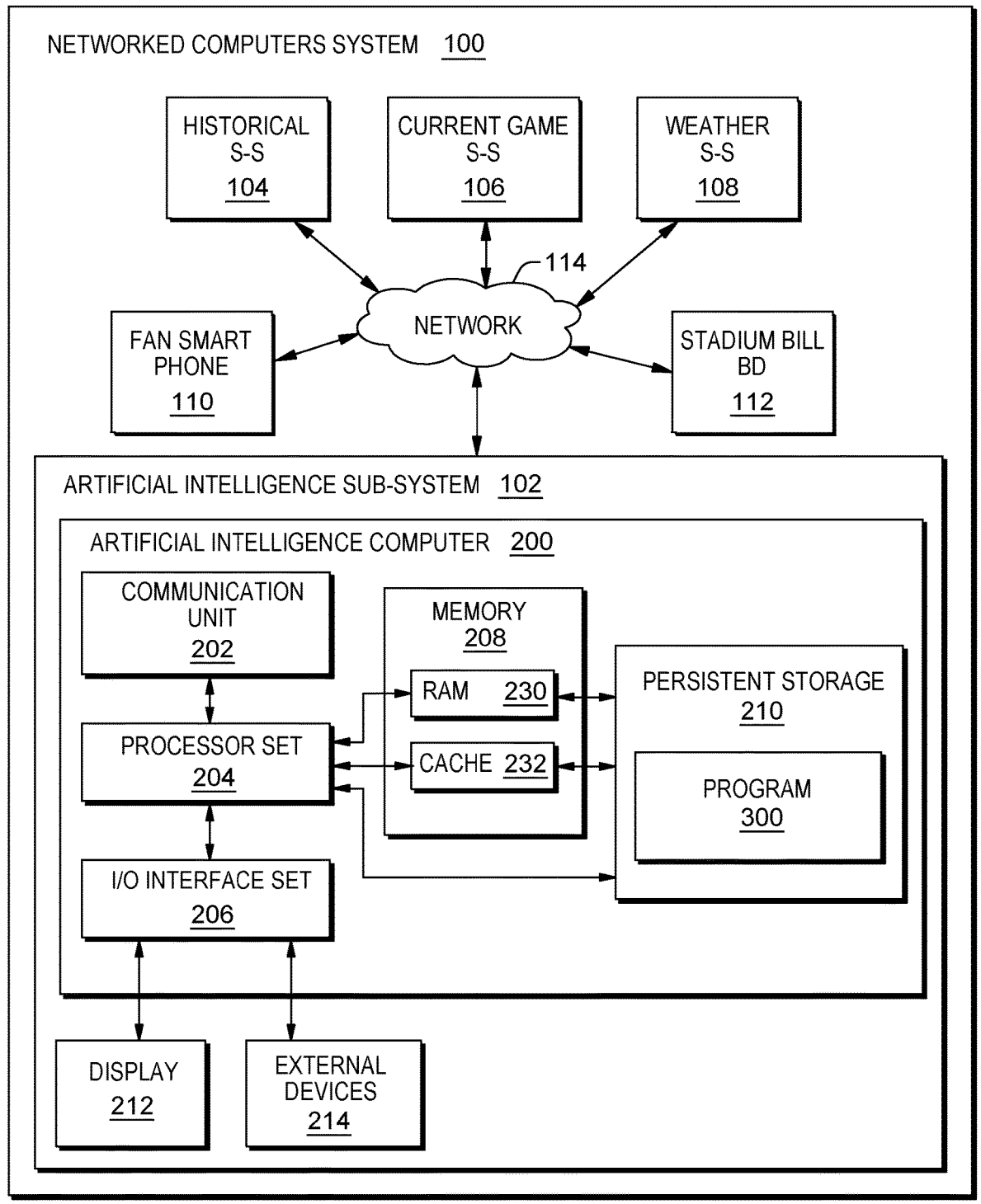
FIG. 1 is a block diagram view of a first embodiment of a system according to the present invention.

Some embodiments of the present invention are directed to computer systems that use artificial intelligence to predict strategies, scenarios and or game plans for sports games that are already in progress. Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: artificial intelligence sub-system 102; historical data subsystem 104; current game data subsystem 106; weather subsystem 108; fan smart phone 110; stadium billboard 112; communication network 114; artificial intelligence computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
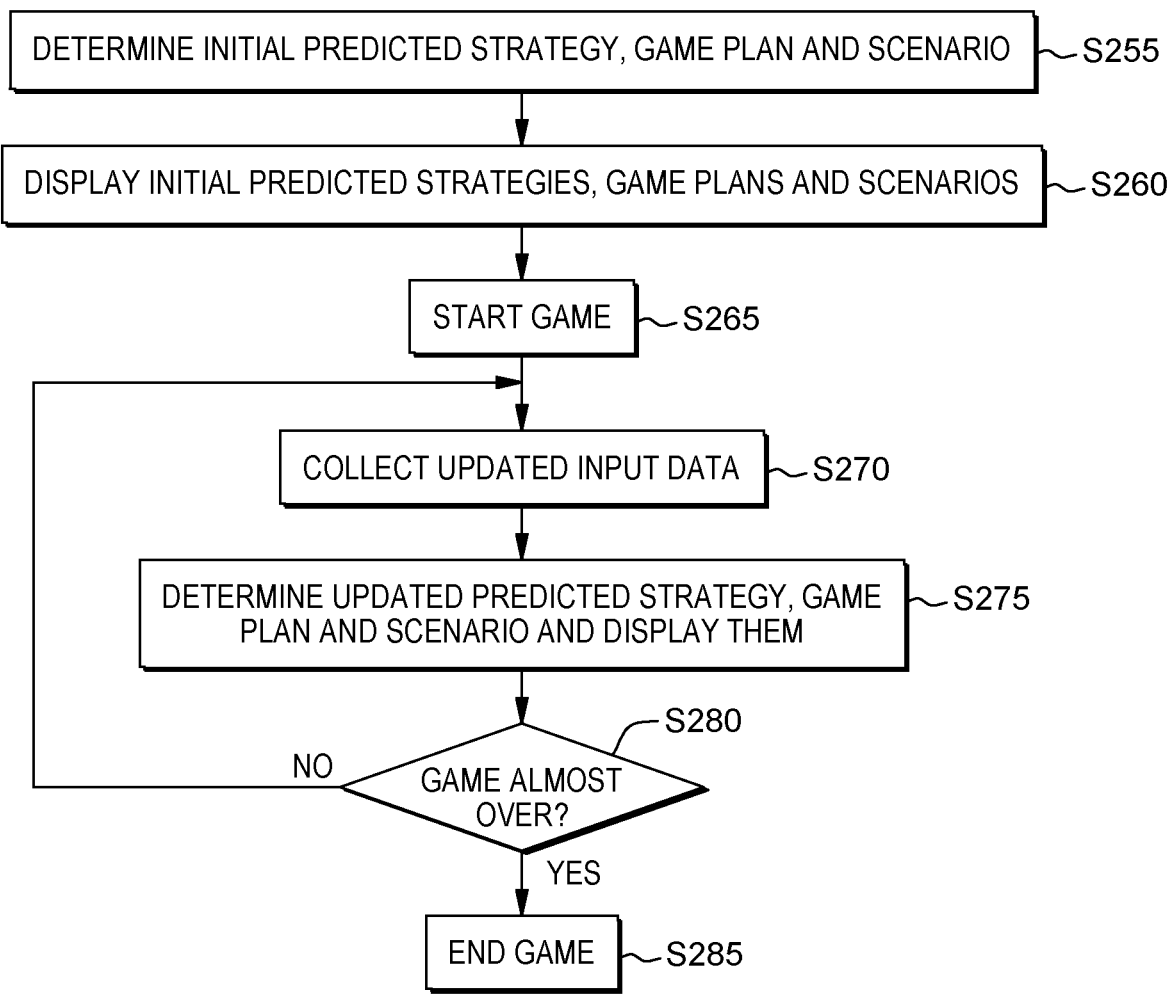
FIG. 2 is a flowchart showing a first embodiment method performed, at least in part, by the first embodiment system.
Figure 3:
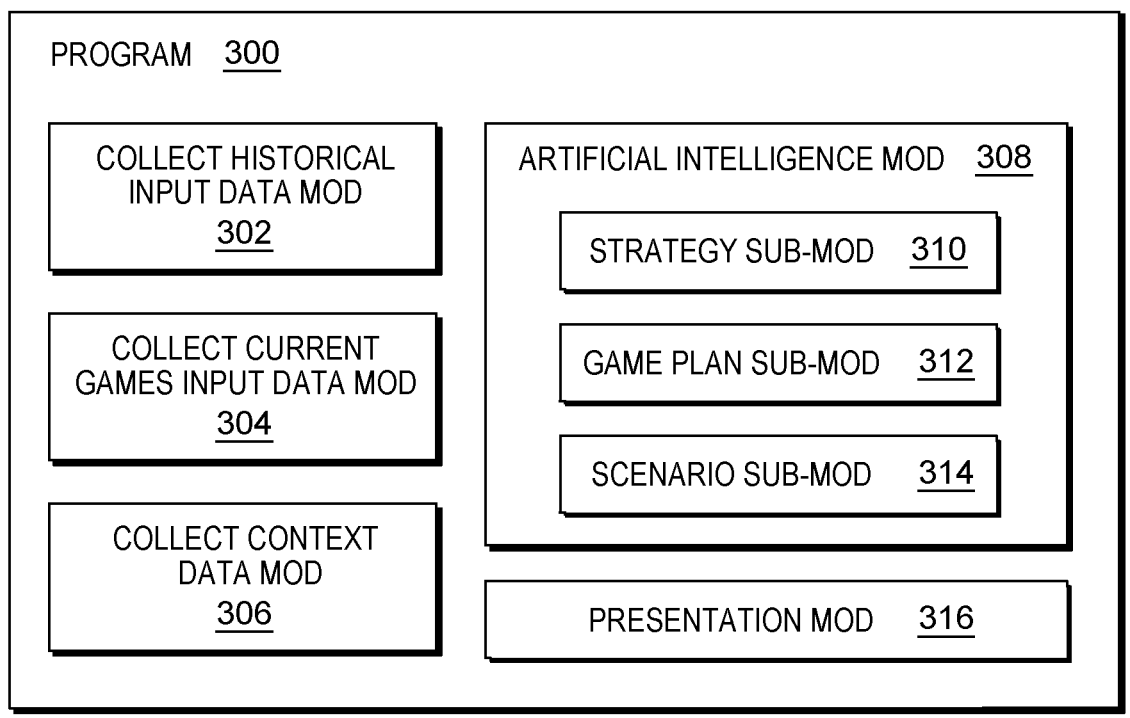
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where collect historical input data module 302 ("mod") and artificial intelligence module ("mod") 308 of program 300 determines an initial predicted strategy, initial predicted game plan and an initial predicted scenario for a Team A with respect to a baseball sports game that Team A is about to play against Team B. At the same time that Team A is going to play Team B, Team C is going to play Team D. The winner of each game will proceed to the next round of the playoffs. In this example, these initial predictions are made 10 minutes before the game between Team A and Team B is scheduled to start. More specifically, to make these initial predictions collect historical input data mod 302, receives historical data from historical data subsystem 104 (see FIG. 1) through communication network 114. This historical data, in this example, relates to statistics on past games played by Team A, past games played by Team B, past games played by other teams and the like.

Processing proceeds to operation S260, where presentation mod 316 the predicted strategy, predicted game plan and predicted scenario to be displayed on: (i) fan smart phone 110; and (ii) stadium billboard 112 (see FIG. 1). FIG. 4A shows that the predicted strategy, game plan and scenario information is displayed to the crowd at the game on stadium billboard 112. Various aspects of this presentation by visual display will be discussed in the following three paragraphs.

As shown in FIG. 4A, Team A's expected strategy is to play aggressively by taking many discretional risks at the margin. This is because strategy sub-mod 310 of artificial intelligence module 308 has determined that Team A, and teams in similar circumstances to Team A, when playing against Team B and teams in similar circumstances to Team B, have had relatively greater success by pursuing an aggressive strategy posture. This general strategy of playing aggressively may include and subsume many specific types of strategy decisions (for example, swinging for the fences, stealing many bases and attempting diving catches of flyballs), but these specific strategy decisions are considered as part of the "game plan" in the parlance of this document.

As further shown in FIG. 4A, Team A's expected game plan with respect to stealing bases is to generally forgo base stealing opportunities that may arise, primarily because the catcher for Team B is known to be excellent at throwing out runners who are attempting to steal a base. This is determined by game plan sub-mod 312 of artificial intelligence module 308. It is noted that this specific game plan of not stealing bases runs counter to the more general strategy of playing baseball aggressively. This should help illustrate how strategies and game plans are different things in the context of this document.

As further shown in FIG. 4A, Team A's expected scenario is that Team A will face Team C in the next round of the baseball playoffs. This is determined by scenario sub-mod 314 of artificial intelligence module 308 based on the fact that the artificial intelligence has determined that Team A is likely to win against Team B, and further that Team C is likely to win against Team D. It is noted that the prediction that Team A is likely to win against Team B is what is called an outcome prediction. Another example of an outcome prediction would be prediction of the score of the game between Team A and Team B. However, it is noted that outcome predictions are different than strategy predictions, are different than game plan predictions and are different than scenario predictions. While various embodiments of the present invention may include outcome predictions, these outcome predictions are not the focus here.

Processing proceeds to operation S265, where collect current games input data mod 304 receives notification that the game between Team A and Team B has commenced. As will be apparent in the discussion of the following steps, one potential novel feature of some embodiments of the present invention is that predicted strategies, game plans and/or scenarios are determined, redetermined and/or continuously redetermined after the game has begun.

Processing proceeds to operation S270, where program 300 collects updated input data to be used by artificial intelligence mod 308 in making updated predictions. More specifically: (i) collect current games input data mod 304 receives information on current games through communication network 114 from current games subsystem 106; and (ii) collect context data mod 306 receives current weather information from weather subsystem 108. In this example, this operation takes place in the middle of the seventh inning of the game between Team A and Team B. Alternatively, predicted strategies, game plans and/or scenarios may be updated more frequently and/or at more regular intervals. For example, in sports with the game clock, the intervals between updates may be determined by the progress of the game clock.

The current games input data mod receives information about the play of the game between Team A and Team B, and also the play of the games between other teams. "Play of the game" means events directly related to the planning of the game, such as game score, time left in the game, injuries occasioned during the game, game events (for example, a stolen base) and the like. In this example, one piece of game play related information received by mod 304 is the fact that Team D has unexpectedly won over Team C in the concurrent game being played. In this example, another piece of game play related information is the fact that Team B's starting catcher was substituted out for a pinch-hitter proceeded to hit a grand slam homerun, thereby scoring four points for Team B, to make the current score at the time of the seventh inning stretch: Team A five versus Team B four.

Context data refers to events surrounding the play of the game that may be relevant to the game, but are not part of the game. In this example, collect context data mod 306 receives only weather data as its context data. Alternatively and/or additionally, other types of context data may be used, such as crowd noise.

Processing proceeds to operation S275, where artificial intelligence mod 308 determines updated predicted strategy, updated predicted game plan and updated predicted scenario. More specifically: (i) strategy sub-mod 310 determines the updated predicted strategy based on updated input data collected and operation S270; (ii) game plan sub-mod 312 determines the updated predicted game plan based on updated input data collected and operation S270; and (iii) scenario sub-mod 314 determines the updated predicted scenario based on updated input data collected and operation S270.

At operation S275, the updated predicted strategy, game plan and scenario are also presented in human understandable form and format both at fan smart phone 110 and stadium billboard 112. As shown in FIG. 4B, Team A's expected strategy has changed from an aggressive strategy to a defensive strategy so that Team A can maximize the probability that it can protect its narrow 5 to 4 lead. As further shown in FIG. 4B, Team A's expected base stealing related game plan has changed to be favorable to stealing bases because Team B's starting catcher is no longer playing in the game. It is noted that the base stealing game plan runs counter to the general strategy of playing defensively—which should help illustrate the difference between strategy and game plan as these terms are used herein. As further shown in FIG. 4B, Team A's current scenario is that Team A is expected to go on to play Team D in the next round of the baseball playoffs. This is different than the initial predicted scenario for Team A because Team D unexpectedly won its concurrent game against Team C. So, to summarize the strategy, game plan and scenario all changed based on updated data collected after the game started.

Processing proceeds to operation S280, where it is determined whether the game is almost over. If the game is not almost over, processing loops back to operation S270 in order to further update the predicted strategy, game plan and scenario. As will be explained in the following subsection of this Detailed Disclosure section, a continuous feedback loop with frequent updates may be employed here. Alternatively, in many embodiments it may make more sense for the looping to continue right until the end of the game. If the game is almost over, in this example, then processing proceeds to operation S285 where the game between Team A and Team B ends.

III. Further Comments and/or Embodiments

Despite tremendous advancements in Information and Communication Technologies (ICT), the audiences of sporting events even today are almost entirely led by expert commentators who share their perspectives and analyses of the sporting event in play. Commentaries on live sports telecasts as well as broadcasts on in-stadium overhead systems are heavily dependent on the knowledge of commentators and the inputs they receive from their research teams, which, generally are extracts from historic stats and other cumulative data. As a result, the telecasts/commentaries provide a limited view, if any at all, on the overall strategy and game plan of the sporting event in progress. Audiences led through commentator's lens may not necessarily get a fuller picture on the dynamics and strategy of the teams involved in a live game where players are formulating strategies on a minute-to-minute basis. The perspectives on the captain's initial strategy and what the team-members are thinking on the fly, and executing in dynamically changing situations are not captured adequately. Therefore, the audience engagement is limited to consuming visual content beamed along with the analyses and views of the commentary team. Sports telecasts are very expensive to produce. In the absence of novelty in viewer engagement in sports telecasts and the competing choices viewers have for entertainment and recreation, there is erosion in the viewership and a diminishing mind-space of even die-hard fans. This impacts the entertainment and broadcasting industry adversely, for which sports events are one of the prime means of revenue generation.

Some embodiments of the present invention may include one, or more, of the following operations, features, characteristics and/or advantages: (i) artificial intelligence (AI) assisted telecast enhancement with extrapolated strategy insights; (ii) an enhancement to reenergize the viewer engagement; (iii) performing real-time correlations of specific inputs (for example, keywords and information sourced from a variety of means) to extrapolate game scenarios and strategies and overlaying them on the streaming feeds—telecast/webcasts (for example, in the form of snippets) to enhance viewer experience and engagement; (iv) a theme of generating various game plans and strategies arising from understanding and performing manipulation(s) of current game scenarios from real-time data from multiple feeds including live audience feedback; (v) methods that integrate live game data in the analysis, as a way of understanding and/or predicting game strategy; (vi) while it is common for teams to have historical strategic preferences (which some embodiments also leverage), individual game plans often deviate from them based on opponent, personnel, environment, and desire to surprise the opponent; and/or (vii) a model designed to identify the dynamic strategy being employed by individuals or a team in a sporting event even if it varies from the historical context.

Some embodiments of the present invention may include one, or more, of the following operations, features, characteristics and/or advantages: (i) an electronic processing device which captures player/coach profiles and environmental data and correlates that with the ongoing game happenings to derive multiple scenarios and outcomes from the current context of the game; (ii) by bringing to the foreground what happens in the minds of players, coaches as well as fans at large and cognitively delivering strategies as an enhancement of live content to audiences, sports broadcasting can be elevated to the next level where viewers are more intensely and intimately involved in sporting events than being passive spectators; (iii) helps in binding and retention of viewers for the content creators and broadcasters; and/or (iv) improves the potential to realize higher advertising revenues as well as paid subscriptions.

Some embodiments of the present invention may include one, or more, of the following operations, features, characteristics and/or advantages: (i) directly helps in retention and augmentation of viewership; (ii) by better engagement and capturing of mind-space of the audiences, content creators and broadcasters improve their revenue potential significantly; (iii) networks can leverage the predictive analysis and prognosis to determine what additional information can be provided to the viewers (for example, in the sport of golf, broadcasters could highlight optimal strategies by providing an overlay of the expected shot trajectory based on player tendencies, club usage, weather, and the hole); and/or (iv) additional examples in the sport of cricket include a processing engine can identify optimum batting order, spin bowler introductions, run-rate acceleration decisions, power-play overs, assessing weather impacts on pitches, predicting Duckworth Lewis scores, batting anomalies, fielding strategies, toss decisions, etc.

Some embodiments of the present invention may include one, or more, of the following operations, features, characteristics and/or advantages: (i) an electronic processor device that acts as a widget to derive/extrapolate perspectives on game plans, strategies, scenarios and outcomes from continuously ingested content streams and data; (ii) device that detects outliers and biases in the ingested feeds and course corrects the generation of scenarios; and/or (iii) generates a player selection and positioning theme based on the assessment of many related factors such as relative utility, suitability and capability of players (player attributes that are advantageous in a game situation), playing conditions including the physical location of the sporting event, site weather, state of the game, strengths/weaknesses of the opposition, importance of the game in the context of a tournament, etc.

Some embodiments of the present invention may include one, or more, of the following operations, features, characteristics and/or advantages: (i) a concept of leveraging both unsupervised learning and reinforced learning to train the learning algorithm which can predict game strategies based on above listed information feeds; (ii) a device to overlay predictive insights and strategies (as snippets, for example) on ongoing telecasts; (iii) an inline pluggable multimedia device that receives various types of content feeds, interprets and analyzes them and extrapolates patterns and scenarios arising from the current context; (iv) predicts player behaviors to specific stimuli using historical player behavioral insights as well as other current influences; and (v) presents a dynamic, real-time view of team strategies with multiple contrasting perspectives taking into consideration critical internal and external factors (for example, current weather, sports pitch/field conditions, attributes and influences of coaches, composition of opponent teams, importance of the sports event in the minds of players and fans, etc.).

Some embodiments of the present invention may include one, or more, of the following operations, features, characteristics and/or advantages: (i) a bot that proposes a dynamically reformulated game strategy based on prioritized inputs and other feeds which can/may be adopted by players and coaches; this type of insight can galvanize live audiences; (ii) a device that generates technology assisted dynamic insights (for example, in the form of on-screen nuggets and snippets) on the progression of a live game; (iii) enhances viewing pleasure; (iv) educates the viewers with diverse perspectives and pep them up for greater spontaneous engagement (for example, the broadcaster can solicit live reactions and meld them into on-screen programming that complements the content of a live relay of the game); and/or (v) directly contributes to the revenue stream of the broadcast networks by preventing flight of viewership and engaging viewers in a superior way to realize better programming subscriptions and advertising revenues.

Figure 5:
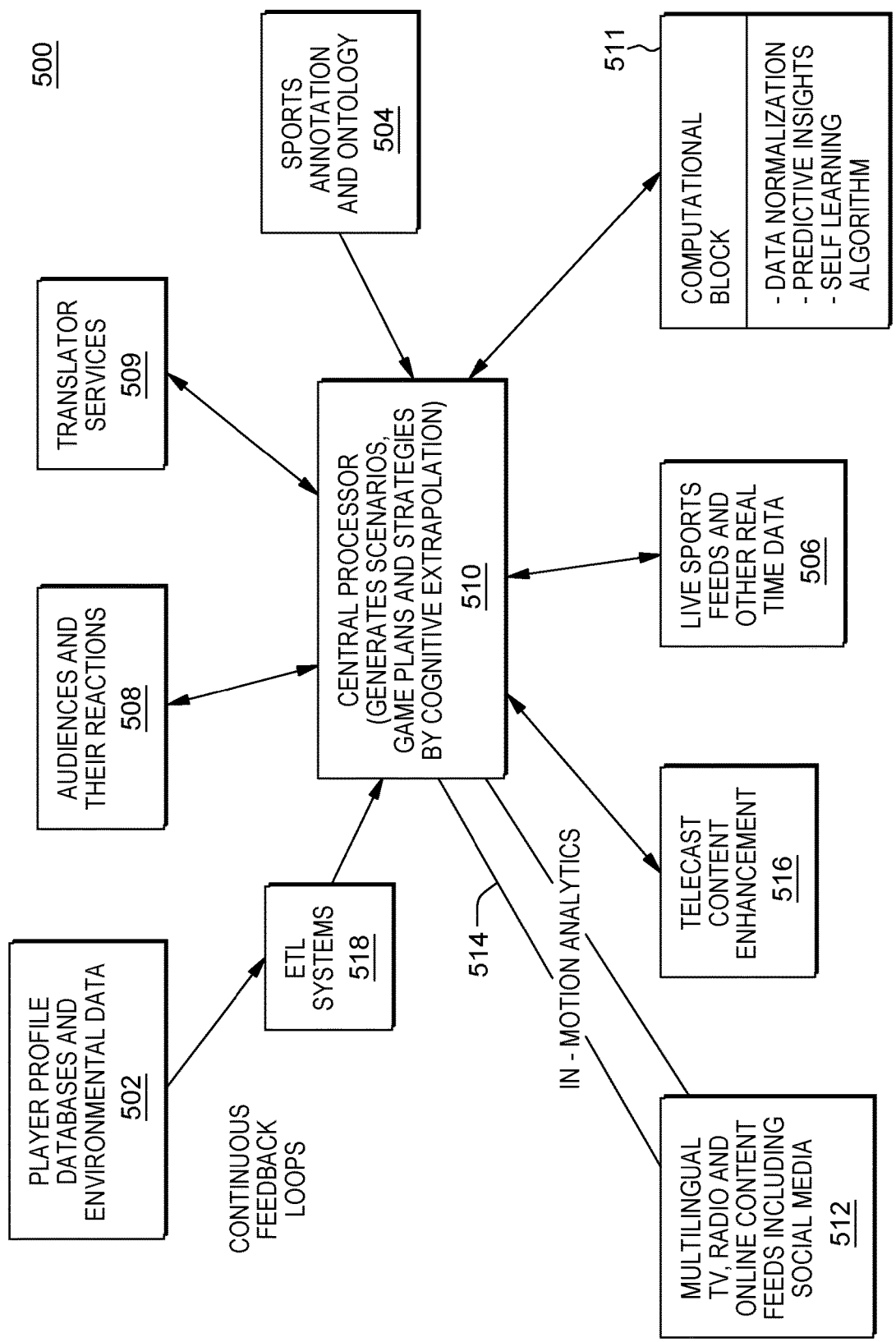
FIG. 5 is a block diagram view of a second embodiment system according to the present invention.

FIG. 5 shows block diagram 500 which is a schematic diagram of an embodiment the invention. Diagram 500 shows how data is ingested from multiple resources in a continuous loop and processed. The ecosystem of the embodiment of block diagram 500 includes the following: (i) block 502 representing detailed publicly available player profiles; (ii) block 504 representing sports annotations and ontology; (iii) blocks 506, 508 representing live and recorded game footage and audience reactions (gathered from multiple sources including social media); (iv) block 509 representing translator services; (v) computational block 511 representing data normalization and predictive insights generation algorithm (includes self-learning capability); (vi) connective block 514 representing in-motion analytics to extract keywords and an inline processor to derive scenarios, strategies and perspectives; (vii) block 512 representing multilingual television, radio and online content; (viii) block 516 representing telecast content enhancement bot (that for example, can visually present the processor output as snippets and nuggets); (ix) ETL (extract transform load) block 518; and (x) central processor(s) set block 510 that generates scenarios, game plans and/or strategies by cognitive extrapolation.

Figure 6:
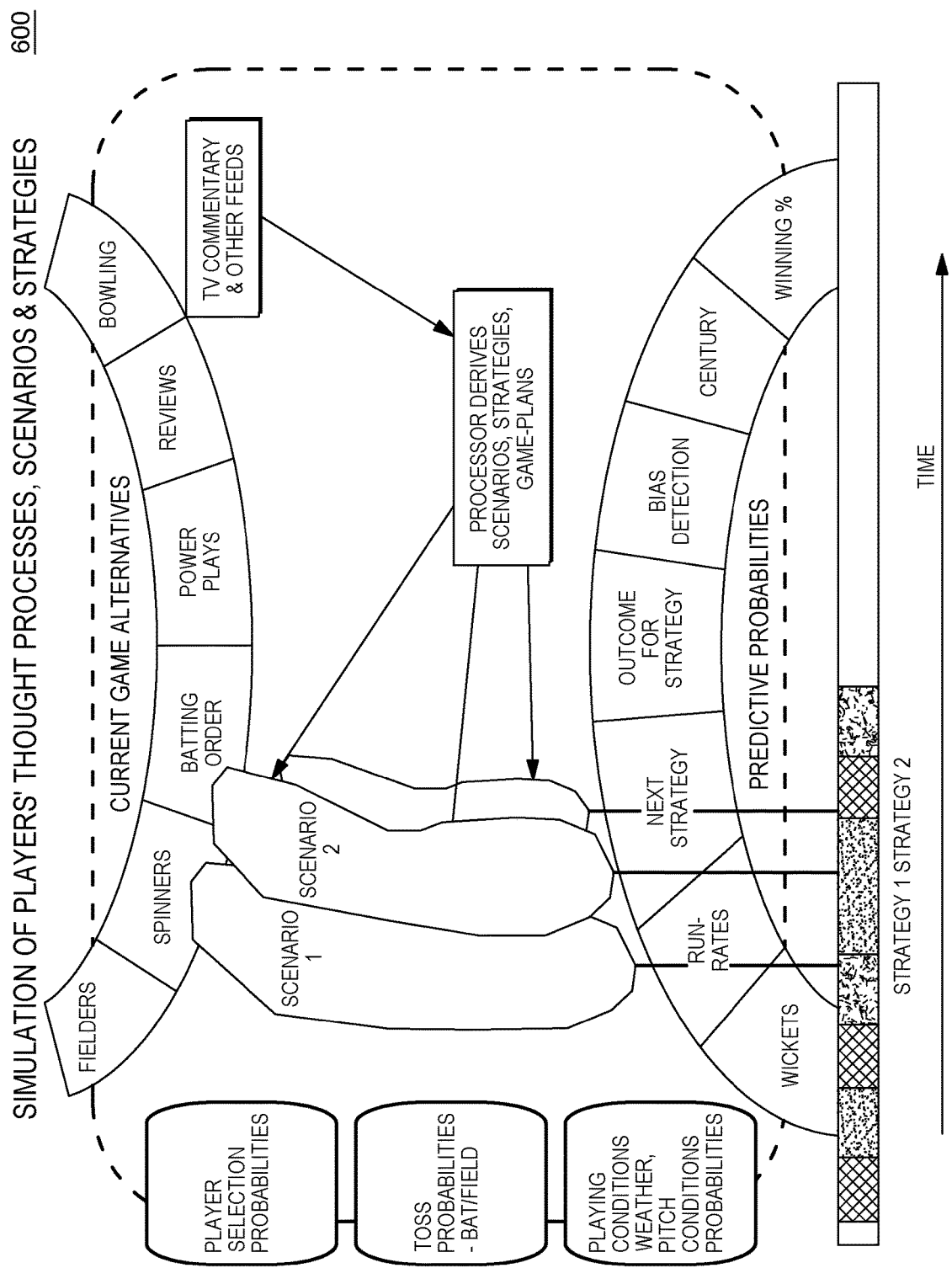
FIG. 6 is a block diagram showing operations performed by the second embodiment system.

As shown in FIG. 6, diagram 600 shows the dynamics and dimensions that come into consideration in a sports event (cricket in this case) in a slightly different perspective compared to block diagram 500. The picture portrays an embodiment's capabilities of generating alternatives (scenarios) and probable strategies as the game is progressing in real-time.

Figure 7:
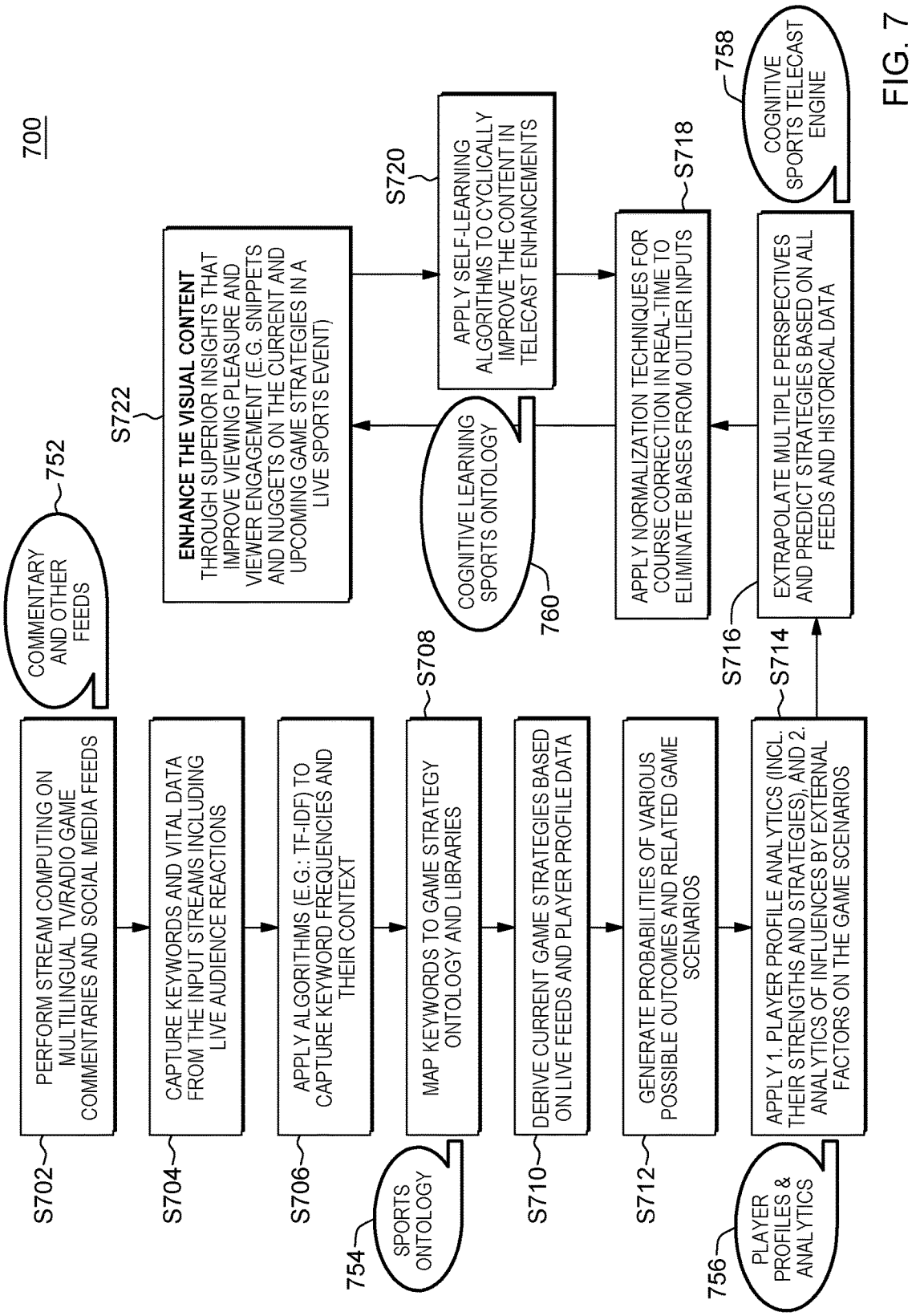
FIG. 7 is a flowchart showing a second embodiment method performed, at least in part, by the second embodiment system.

As shown in FIG. 7, flowchart 700 shows a process flow of an embodiment of a method according to the present invention. FIG. 7 shows the high-level end-to-end view of the flow and sequence of actions that map to the flows depicted in block diagram 500 and diagram 600. In the method of flowchart 700, the method includes the following operations (with process flow among and between and the operations being shown by arrows in flowchart 700): S702, S704, S706, S708, S710, S712, S714, S716, S718, S720 and S722. Block 752 represents an input to operation S702. Block 754 represents and inputs to operation S708. Block 756 represents an input to operation S714. Block 758 represents an input to operation S716. Block 760 represents an input to operation S720. The method of flowchart 700 is a data normalization and predictive insights algorithm.

The following paragraphs list data variables to help show the data model used by this invention.

C1, C2, C3 . . . —Multilingual commentary/data feeds (including TV, radio, online news sites, social media sites, print media inputs etc.)

K1, K2, K3 . . . —Keywords mapped to specific scenarios or strategy

S1, S2, S3 . . . —Scenarios derived or predicted

G1, G2, G3 . . . —Strategy definitions conformant to existing library/ontology

W1, W2, W3 . . . —Weather and sports field conditions data, that is, environmental data P1, P2, P3 . . . Player profile records R1, R2, R3 . . . Historical results data Some features of an embodiment of an AI based Telecast Enhancement and Predictive Insights & Scenario Generator algorithm are as follows: (i) using standard deviation technique, perform data normalization to identify outliers and biases in the input data from all feeds ingested from multiple sources; (ii) determine the frequencies of keywords from content feeds; (iii) perform the intent and context ranking of keywords to map to the game scenarios sourced from existing ontologies and libraries; (iv) compute the probability of various game scenarios taking into consideration past game results and present player-profile data; (v) extrapolate game strategies based on the probability of multiple game scenarios; and (vi) overlay predictions on scenarios, insights and strategies for live telecast enhancement.

A machine learning algorithm according to the present invention will now be described in the following two paragraphs.

Operations of the machine learning algorithm that take place prior to the sporting event will be described in this paragraph. Extensive historical data related to the aforementioned variables is gathered. Data collection might leverage manual data collection, even additional machine learning (or deep learning) algorithms designed to process photographic or video data and extract players, formations, weather conditions, etc. Historical context for all data is logically archived and analyzed carefully because sports strategy changes over time as rules and technology change and the athletes change. Supervised (and unsupervised) learning on this data is performed to train a model to correctly predict the outcomes of various strategic sporting situations specific to a particular game. That is, likelihood of a particular type of play, a certain player being used on the field, etc. is trained to be predicted. Multiple models could be created to predict various potential outcomes. Training can be designed to prioritize data that is most relevant to a given situation (that is data gathered about a team/player in the current sports season will be more valuable that data from several years ago). Training can also be designed to prioritize data reflective of the actual athletes/coaches participating in the event. If the data available on specific athletes is insufficient, then generalized data may be used in the model temporarily.

Operations of the machine learning algorithm that take place during the sporting event will be described in this paragraph. Live data is fed into the algorithm and present predicted insights such as outcomes, game plans and strategies for particular conditions. Live data may be acquired, ingested and processed using the same methodology as historical data. The generated insights and predicted strategies to viewers or commentators as described above are presented. If the outcome of a specific action differs from the prediction, alternative options and likelihood of success can be recalculated to offer immediate feedback about how effective the used strategy was in comparison to other predicted strategies. Reinforcement learning is applied to the algorithm to allow it to morph, as new data points are collected from the current sporting event and utilized. This can significantly improve the accuracy of the model as each team approaches each game with its own/particular strategy. As more events happen, the model can adapt to the new data and begin to better identify the required actions and interventions of athletes/coaches.

Implementation of an embodiment of the present invention includes the following operations: (i) a central processor, herewith referred as Enhanced Sports Telecast Engine (ESTE) discovers and identifies the required TV feeds, channels with durations for specified sports; (ii) ESTE establishes channels to connect to the feeds and captures input data; (iii) ESTE performs Stream Computing to capture keywords relative to the sports event in progress; (iv) ESTE determines the frequencies of keywords from content feeds; (v) ESTE compares and maps the keywords to the sports ontology to build specified scenarios; (vi) ESTE performs the intent and context ranking of keywords to map to game scenarios that are aligned to existing sports libraries a builds a strategy corpus for the specific sport; (vii) ESTE ingests social media feeds for audience polls and captures feedback (for example, various alternative strategies); (viii) ESTE computes the probability of various game scenarios taking into consideration past game results, present player-profile data and environmental data using the machine learning algorithm; (ix) if the determined probability is above the threshold settings, ESTE predicts and builds various strategies for the game in progress in specified time intervals; (x) ESTE extrapolates various game strategies based on the probability of multiple game scenarios; (xi) ESTE identifies outlier inputs and biases; using standard deviation technique performs data normalization to filter outliers and biases in the input data (commentary feeds as well as audience reactions) ingested from multiple sources; (xii) ESTE employs continuous self-learning to learn from the deviations noticed between predicted insights and actual outcomes and strategies and the error margins thereof; (xiii) ESTE overlays insights and predictions on scenarios and strategies for live telecast enhancement; and (xiv) a bot can read out or output insights and various strategies on other chosen channels and forums.

Some embodiments of the present invention may include one, or more, of the following operations, features, advantages and/or characteristics: (i) machine learning auto-corrects predictions via feedback loop to enhance the visual content delivery with snippets and nuggets on current and upcoming game strategies; (ii) theme of some embodiments is on predictive strategies; (iii) ingestion and processing of multiple audiovisual broadcast streams, social media feeds and environment data for a sporting event to extrapolate game strategies by contextual real-time analysis; and/or (iv) leverage both expert commentaries as well as live audience reactions.

Some embodiments of the present invention may include one, or more, of the following operations, features, advantages and/or characteristics: (i) built on a theme of generating various game plans, perspectives and scenarios to extrapolate strategies arising from therein, by understanding and processing real-time data from multiple live sports feeds, historic sports ontologies and environmental influences; (ii) extrapolating and predicting game strategies and overlaying those insights to complement and enhance the audio commentary for improving viewer pleasure and engagement; (iii) analysis is performed to generate perspectives and cognitive self-learning; (iv) uses the concept of analytics on Stream Computing on audio visual and textual feeds and the processing of keywords; (v) predicated on cognitive analytics on a number of static and dynamic multimedia feeds to improve the viewer experience and engagement in television broadcast networks; (vi) an inline multimedia processing device to extrapolate game scenarios and strategies from current broadcasts and other related static and dynamic feeds to enhance sports viewing aggregation and processing of multiple multimedia audiovisual broadcast feeds and social media textual feeds and environment data for a sporting event; (vii) disseminates various game strategies by contextual analysis of the ingested data along with on-field progression of play; (viii) provides insights and predicting strategies to engage the viewer better and enhance viewing pleasure; (ix) an artificial intelligence aided content enhancement engine that analyzes multiple TV channel feeds, historical game ontologies, environmental data and social media content to derive keywords and contextualizes them to cognitively extrapolate game strategies and enhancing video broadcasts for better viewer pleasure and engagement; (x) leverages data to predict game strategies that will or should be applied to the current circumstances; and/or (xi) designed to provide real-time perspectives on which strategies are/will most likely be or to be employed in the current situation based both on historical data, as well as real-time feedback from the current game.

Some embodiments of the present invention may include one, or more, of the following operations, features, advantages and/or characteristics: (i) a near real-time simulation while the game is in progress that provides: (a) perspectives on game plans, strategies, scenarios, and (b) outcomes on a near real-time from continuously ingested content streams and data; (ii) a continuous learning mechanism with a cognitive engine and machine learning delivers insights to the processor in terms of the previous strategies adoptions, event correlation and probability mappings to the scenarios and strategies, historical player predictions, telecast enhancements, bias detection algorithms, etc.; (iii) specialized hardware that is going to turn these insights around faster to provide real time analysis in significantly less time than traditional computers; (iv) an inline electronic processor multi-media device that converts textual analysis to video-clip nuggets that can be inserted into broadcast streams showing virtual-reality assisted video frames involving live players playing in the ongoing sports event; and (v) event-scenario-strategy-action-outcome based patterns which are fed on a continuous learning curve based cognitive engine which autonomously derives and adjusts to the multiple probabilities and events and adjusts the feeds to the GUI (graphical user interface) display widget.

Some embodiments of the present invention may include one, or more, of the following operations, features, advantages and/or characteristics: (i) a way to improve the broadcast content on television networks for better engagement of today's technology savvy, connected/networked viewers by overlaying snippets of insights and predictions that capture the imagination of the viewers and bind them to the ongoing broadcast event; (ii) this is achieved by combining several technologies as an inline pluggable multimedia device that receives various types of content feeds, interprets and analyzes them and extrapolates patterns and scenarios arising from the current context; (iii) predicts player behaviors to specific stimuli using historical player behavioral insights as well as other current influences; (iv) uses cognitive and machine learning technologies to derive interactive sessions between the audience and the actual broadcasts; (v) utilizes a hardware in-line processor device that is custom created to handle several types of audio, visual and textual data to generate the insights and predictions, which is a significant new development and not merely finding a new use case for existing computing technologies; and/or (vi) a Predictive Visualizer component overlaying on a TV feed which will have multiple new technology components and hardware devices, new client-side applications which will provide the requisite interactivity, learning and feedback mechanisms, handling of in-motion analytics, event probability sequencing algorithms with bias detection and corrections, conversions of text-based strategy predictions to virtual reality-based snippets, etc.

Some embodiments of the present invention may include one, or more, of the following operations, features, advantages and/or characteristics: (i) a real-time simulation of the multiple strategy-plays during the game for the audience and viewers where they would be able to generate hypothetical scenarios basis of multiple probabilistic events, multiple statistical models, player strengths, playing conditions and ever-changing situations during the game itself; (ii) a potential tool for the opposing teams in drawing multiple battle-lines and used by coaches to refine the strategies during the play (so long as this is consistent with the sporting game being played); and/or (iii) provides an alternative to today's sports feed technologies with interactive media content, whether live or recorded, to any device with anytime and anywhere convenience.

Embodiments including two forms of display in near real-time will be discussed in the following paragraphs.

Server Component as "Cognitive Sports Visualizer Television Overlay": This builds on the event probabilities and the predictive insights and produces a tree-based visual display of the various events, their correlations to a scenario, multiple scenario correlations to a predictive action-based strategy, built by the hardware device and also predicts a suitable outcome with the various strategies. These event-scenario-strategy-action-outcome patterns are derived and fed on a continuous basis as a learning curve to the cognitive engine which autonomously derives and adjusts to the multiple probabilities and events and adjusts the feeds to the widget.

The Cognitive Sports Visualizer Overlay Widget here develops the VR (virtual reality) video clip that translates textual analysis to video frames showing some players involved in the game at present, so there is authenticity and freshness for this insight compared to video clips from archives. The screen will also have an additional color map overlay feature on the screen to show the probabilities of the game moving in a certain direction and a RAG (red amber green) based status on the battling teams, value each player brings to the game, etc.

Client Component is present on any hand-held device and takes a current feed from the server component but provides a personalized view of the predictive strategies and is able to toggle between multiple views as audience generated statistics, historic statistics, dynamic selection of event probabilities, captain's view, commentator's view, etc.

Figure 8:
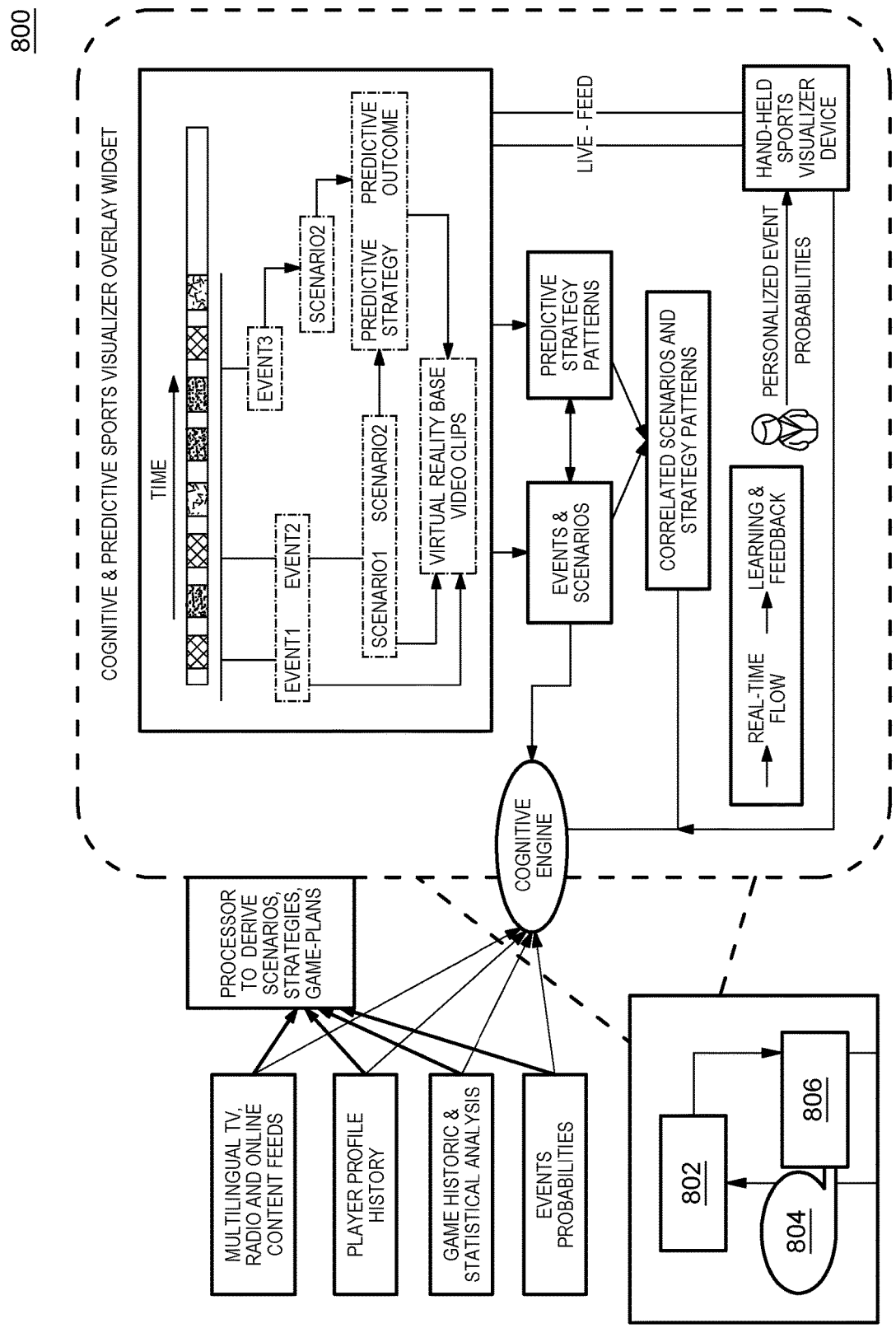
FIG. 8 is a block diagram view of a third embodiment system according to the present invention.

As shown in FIG. 8, block diagram 800 shows an embodiment of the present invention. Some portions of block diagram 800 will be described in the following paragraphs.

Block 802 enhances the visual content through superior insights that improve viewing pleasure and viewer engagement (for example snippets and nuggets on the current and upcoming game strategies in a live sports event).

Block 804 provides a cognitive learning sports ontology.

Block 806 applies self-learning algorithms to cyclically improve the content in telecast enhancements.

Some embodiments of the present invention may include one, or more, of the following operations, features, advantages and/or characteristics: (i) provides a near real-time simulation while the game is in progress and is not built on a post-analysis of a game; (ii) disambiguates between the captain's and/or team's view of the current strategies during an in-progress game-play as opposed to a single track and repetitive theme generated by the commentators; (iii) an electronic processor device that acts as a widget to derive/extrapolate perspectives on game plans, strategies, scenarios and outcomes from continuously ingested content streams and data; (iv) provides a continuous learning mechanism with a cognitive engine to the processor in terms of the previous strategies adoptions, event correlation and probability mappings to the scenarios and strategies, historical player predictions, telecast enhancements, bias detection algorithms, etc.; (v) uses the concept of analytics on Stream Computing on audio visual and textual feeds and the processing of keywords, the theme and application are entirely different and predicated on cognitive analytics on a number of static and dynamic multimedia feeds to improve the viewer experience and engagement in television broadcast networks; (vi) an inline multimedia processing device to extrapolate game scenarios and strategies from current broadcasts and other related static and dynamic feeds to enhance sports viewing; (vii) an electronic processor device that acts as a widget to derive/extrapolate perspectives on game plans, strategies, scenarios and outcomes from continuously ingested content streams and data; and/or (viii) provides a continuous learning mechanism to the processor in terms of the previous strategies adoptions, event correlation and probability mappings to the scenarios and strategies, historical player predictions, telecast enhancements, bias detection algorithms, etc.

Some embodiments of the present invention may include one, or more, of the following operations, features, advantages and/or characteristics: (i) uses specialized hardware that is going to turn these insights around faster to provide real time analysis in significantly less time than traditional computers with: (a) hardware in-line processor device, (b) inline multi-media processing device, (c) cognitive sports visualizer television overlay widget, and (c) visualizer client component which would be present on any hand-held device; (ii) Insights & Machine Learning: offers improved insights by leveraging real time analysis from multilingual commentary/data feeds (including TV, radio, online news sites, social media sites, print media inputs, etc.); (iii) is fed to a machine learning curve with sophisticated event-correlation models and weights based on predictions and player profiles; (iv) these event-scenario-strategy-action-outcome patterns are derived and fed on a continuous basis as a learning curve to the cognitive engine which autonomously derives and adjusts to the multiple probabilities and events and adjusts the feeds to the widget; (v) a multi-feed analysis of diverse inputs complimented by a configurator that takes additional point-in-time inputs reflecting current environment and playing conditions that can influence the game to generate predictive insights; (vi) Visual Nugget Display: An inline electronic processor that converts textual analysis to videoclip nuggets that can be inserted into broadcast streams showing virtual-reality assisted video frames involving live players playing in the ongoing sports event; (vii) provides for a way to enhance the broadcast content on television networks for better engagement of today's technology savvy, connected/networked viewers by overlaying snippets of insights and predictions that capture the imagination of viewers and bind them to the ongoing broadcast event; and/or (viii) this is achieved by bringing together new technologies as well as finding new uses of some existing ones.

Some embodiments may include the use of virtual reality simulation to predict actions or responses in game situations with real players (including those that are not playing or selected in the current game) to present elevated insights to viewers which is a novel advancement. For example, predict how player X would impact the current situation with his/her skills/experience in the context of game in progress and its internal and external influencing factors.

Some embodiments may include VR assisted predictive visualizer component overlays snippets on a live TV feed. This opens up several new possibilities—new technology components and hardware devices, new client-side applications that provide requisite interactivity, learning and feedback mechanisms, handling of in-motion analytics, event probability sequencing algorithms with outlier filtration and corrections, etc.

Some embodiments of the present invention may include one, or more, of the following operations, features, advantages and/or characteristics: (i) uses the current technologies of interactive visualizations, continuous ingestion feeds, tensor flows and possibly GPU machines; (ii) provides a continuous learning mechanism to the processor in terms of the previous strategies adoptions, event correlation and probability mappings to the scenarios and strategies, historical player predictions, telecast enhancements, bias detection algorithms, etc. (iii) Inline multi-media device (Overlay to TV): hardware devices that help quickly process the data and provide feedback onto the screen in near real time to enhance a broadcast; (iv) Textual Analysis: a method to harvest live text feeds and drive real time insights about the sporting event; (v) Continuously Ingested Text Feed: a continuous ingested feed from several sources to an inline hardware processor which continuously feeds insights to the predictive visualizer component; (vi) virtual reality assisted video frames involving live players (for example, overlaying virtual players on the live image to show how things might look differently if different personnel or strategies were being used); and/or (vii) Probability Color Maps: this is one example of how some embodiments of the present invention might be used to help convey predictive insights to a viewer (for example, the screen may have an additional color map overlay feature to show the probabilities of the game moving in a certain direction or the value each player brings to the game, etc.).

Some embodiments of the present invention may include one, or more, of the following operations, features, advantages and/or characteristics: (i) uses a learning engine for leveraging the collected data to identify game strategies and scenarios, and then predict in real-time how an individual or team will probably or can optimally respond to improve the chances of winning the said game; (ii) the learning engine continually learns the current and previously used strategies, correlates events and maps probability to scenarios and outcomes; (iii) the engine is capable of detecting and normalizing extreme inputs through bias detection algorithms; (iv) a unique video overlays as probability color maps to show the probabilities of the game's progress in a certain direction or the value each player in a given situation in the game, etc.; (v) improves the viewer experience through the intervention of broadcasters; (vi) utilizes game data from a variety of sources—live and historic—on players/team historical performance, current game scenarios, textual feeds, audio commentary on the contest in progress and leverages a processing engine to perform real-time analysis to identify/predict the best strategy to be employed in the contest; and/or (vii) uses specialized hardware devices that can generate video overlays to improve the programming based on the insights generated by a cognitive engine in real-time.

Prediction of outcome can happen for an end result of a game or the strategy a team or a player is likely to use in the game. There are currently conventional artificial intelligence computer systems that predict end results (herein sometimes referred to as "outcomes") of sports games. While some embodiments of the present invention may predict outcomes, some embodiments of the present invention predict strategies, scenarios and or game plans (see definitions of these terms in the Background section) which is different than merely predicting outcomes. Some embodiments of the present invention focus on how a player or team will behave, that is, what strategy they may use in a current game situation. This is prediction of strategy rather than the end result. It allows for viewers to dynamically replace a player in a live game with a bench player in a VR simulation interactively and see what impact that may cause in the current scenario.

Some embodiments of the present invention use an inline electronic processor multi-media device that converts textual analysis to video-clip nuggets that can be inserted into broadcast streams showing virtual-reality assisted video frames involving live players playing in the ongoing sports event. Some embodiments of the present invention use VR technology to allow viewers to dynamically replace an existing player to visualize the impact.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   during a sports game in progress, receiving, in real-time, a first data set including data relevant to strategy likely to be used by at least one opponent in the sports game, with the first data set including data relating to a first event that has occurred during the sports game in progress, real-time environmental data including weather conditions and crowd responses, and historical data of one or more participants in the sports game;
   applying artificial intelligence to the first data set to predict a first predicted strategy likely to be used by the at least one opponent during the sports game, the applying the artificial intelligence including temporally prioritizing an importance of events from the historical data based on a chronological order of occurrence of the events and iteratively generating an updated predicted strategy in real-time by integrating live game data collected during the sports game using continuous reinforcement learning, wherein the live game data to which the artificial intelligence is applied comprises live game footage of the sports game in progress; and
   presenting the first predicted strategy and the updated predicted strategy in human understandable form and format.

2. The CIM of claim 1 wherein the applying the artificial intelligence further predicts a second predicted strategy likely to be used by an opponent of the at least one opponent during the sports game, the CIM further comprising:
   presenting the second predicted strategy in human understandable form and format.

3. The CIM of claim 1 further comprising:
   during the sports game in progress and subsequent to the receiving the first data set, receiving a second data set including data relevant to strategy likely to be used by at least one of the opponents in the sports game, with the second data set including data relating to a second event that has occurred during the sports game in progress subsequent to the receiving the first data set;
   applying artificial intelligence to the second data set to predict a second predicted strategy likely to be used by the at least one opponent during the sports game; and
   presenting the second predicted strategy in human understandable form and format.

4. The CIM of claim 1 wherein the first event is an event that occurred as part of a play of the sports game.

5. The CIM of claim 1 wherein the first event relates to actions taken by people watching the sports game, the actions comprising causing crowd noise.

6. The CIM of claim 1 wherein the first event comprises an event in one or more other sports games occurring concurrently with the sports game.

7. The CIM of claim 1, wherein the iteratively generating the updated predicted strategy in real-time includes integrating the live game data collected during the sports game with social media feed data and audience polls using the continuous reinforcement learning.

8. The CIM of claim 1, wherein:
   the live game data to which the artificial intelligence is applied comprises time remaining in the sports game; and
   the continuous reinforcement learning is based at least in part on the time remaining in the sports game.

9. The CIM of claim 1, wherein the first data set includes a coach profile.

10. A computer-implemented method (CIM) comprising:
    during a sports game in progress, receiving, in real-time, a first data set including data relevant to a scenario applicable to at least one opponent in the sports game, with the first data set including data relating to a first event that has occurred during the sports game in progress, real-time environmental data including weather conditions and crowd responses, and historical data of one or more participants in the sports game;
    applying artificial intelligence to the first data set to predict a first predicted scenario likely to be applicable to the at least one opponent during or after the sports game, the applying the artificial intelligence including temporally prioritizing an importance of events from the historical data based on a chronological order of occurrence of the events and iteratively generating an updated predicted scenario in real-time by integrating live game data collected during the sports game using continuous reinforcement learning, wherein the live game data to which the artificial intelligence is applied comprises live game footage of the sports game in progress; and
    presenting the first predicted scenario and the updated predicted scenario in human understandable form and format.

11. The CIM of claim 10 wherein the application of artificial intelligence further predicts a second predicted scenario likely to be applicable to an opponent of the at least one opponent during or after the sports game, the CIM further comprising:

presenting the second predicted scenario in human understandable form and format.

12. The CIM of claim 10 further comprising:

during the sports game in progress and subsequent to the receiving the first data set, receiving a second data set including data relevant to scenario likely to be applicable to at least one of the opponents in the sports game, with the second data set including data relating to a second event that has occurred during the sports game in progress subsequent to the receiving the first data set;

applying artificial intelligence to the second data set to predict a second predicted scenario likely to be applicable to the at least one opponent during or after the sports game; and presenting the second predicted scenario in human understandable form and format.

13. The CIM of claim 10 wherein the first event is an event that occurred as part of a play of the sports game.

14. The CIM of claim 10 wherein the first event relates to actions taken by people watching the sports game, the actions comprising causing crowd noise.

15. The CIM of claim 10 wherein the first event comprises an event in one or more other sports games occurring concurrently with the sports game.

16. A computer-implemented method (CIM) comprising:

during a sports game in progress, receiving, in real-time, a first data set including data relevant to a game plan likely to be used by at least one opponent in the sports game, with the first data set including data relating to a first event that has occurred during the sports game in progress, real-time environmental data including weather conditions and crowd responses, historical data of one or more participants in the sports game, and an event in one or more other sports games occurring concurrently with the sports game;

applying artificial intelligence to the first data set to predict a first predicted game plan likely to be used by the at least one opponent during the sports game, the applying the artificial intelligence including temporally prioritizing an importance of events from the historical data based on a chronological order of occurrence of the events and iteratively generating an updated predicted game plan in real-time by integrating live game data collected during the sports game using continuous reinforcement learning, wherein the live game data to which the artificial intelligence is applied comprises live game footage of the sports game in progress; and presenting the first predicted game plan and the updated predicted game plan in human understandable form and format.

17. The CIM of claim 16 wherein the applying the artificial intelligence further predicts a second predicted game plan likely to be used by an opponent of the at least one opponent during the sports game, the CIM further comprising:

presenting the second predicted game plan in human understandable form and format.

18. The CIM of claim 16 further comprising:

during the sports game in progress and subsequent to the receiving the first data set, receiving a second data set including data relevant to a game plan likely to be used by at least one of the opponents in the sports game, with the second data set including data relating to a second event that has occurred during the sports game in progress subsequent to the receiving the first data set;

applying artificial intelligence to the second data set to predict a second predicted game plan likely to be used by the at least one opponent during the sports game; and presenting the second predicted game plan in human understandable form and format.

19. The CIM of claim 16 wherein the first event is an event that occurred as part of a play of the sports game.

20. The CIM of claim 16 wherein the first event relates to actions taken by people watching the sports game, the actions comprising causing crowd noise.

* * * * *